US008096877B2

(12) United States Patent
Hoffman

(10) Patent No.: US 8,096,877 B2

(45) Date of Patent: Jan. 17, 2012

(54) GAMING SYSTEM, GAMING DEVICE AND GAMING METHOD PROVIDING STACKING SYMBOLS

(75) Inventor: Benjamin Hoffman, Reno, NV (US)

(73) Assignee: IGT, Reno, NV (US)

( * ) Notice: Subject to any disclaimer, the term of this patent is extended or adjusted under 35 U.S.C. 154(b) by 1096 days.

(21) Appl. No.: 11/936,364

(22) Filed: Nov. 7, 2007

(65) Prior Publication Data

US 2009/0118004 A1 May 7, 2009

(51) Int. Cl.
*A63F 13/00* (2006.01)

(52) U.S. Cl. ................. 463/31; 463/30; 463/20; 463/25

(58) Field of Classification Search .................... 463/20, 463/25, 30, 32, 31
See application file for complete search history.

(56) References Cited

U.S. PATENT DOCUMENTS

| | | | |
|---|---|---|---|
| 4,099,722 | A | 7/1978 | Rodesch et al. |
| 4,200,291 | A | 4/1980 | Hooker |
| 4,448,419 | A | 5/1984 | Telnaes |
| 4,573,681 | A | 3/1986 | Okada |
| 4,636,951 | A | 1/1987 | Harlick |
| RE34,244 | E | 5/1993 | Hagiwara |
| 5,395,111 | A | 3/1995 | Inoue |
| 5,564,700 | A | 10/1996 | Celona |
| 5,584,764 | A | 12/1996 | Inoue |
| 5,609,524 | A | 3/1997 | Inoue |
| 5,704,835 | A | 1/1998 | Dietz, II |
| 5,720,662 | A | 2/1998 | Holmes, Jr. et al. |
| 5,722,891 | A | 3/1998 | Inoue |
| 5,752,881 | A | 5/1998 | Inoue |
| 5,769,716 | A | 6/1998 | Saffari et al. |
| 5,807,172 | A | 9/1998 | Piechowiak |
| 5,833,537 | A | 11/1998 | Barrie |
| 5,863,249 | A | 1/1999 | Inoue |
| 5,951,397 | A | 9/1999 | Dickinson |
| 5,980,384 | A | 11/1999 | Barrie |

(Continued)

FOREIGN PATENT DOCUMENTS

| | | |
|---|---|---|
| EP | 058488 | 8/1982 |

(Continued)

OTHER PUBLICATIONS

Wolf Run Video Slots Advertisement, written by IGT, published in 2006.

(Continued)

*Primary Examiner* — Dmitry Suhol
*Assistant Examiner* — Brandon Gray
(74) *Attorney, Agent, or Firm* — K&L Gates LLP

(57) ABSTRACT

The gaming system, gaming device and method provides a reel game that includes stacks of symbols configured on the reels to minimize the effects of blocking often associated with stacks of symbols. The gaming device includes a plurality of reels wherein each reel includes a reel-strip and a plurality of symbols. The plurality of reels can be configured to include at least one stack of symbols wherein a stack of symbols is formed by placing a plurality of a designated symbol adjacent to each other on a single reel. In one embodiment, the gaming device is configured such that each subsequent reel includes a quantity of stacked symbols that is greater than the quantity of stacked symbols on a previous reel. This configuration provides that winning symbol combinations including non-stacked symbols can be formed across adjacent reels even if each reel generated a stack of symbols.

17 Claims, 11 Drawing Sheets

U.S. PATENT DOCUMENTS

| | | | |
|---|---|---|---|
| 5,984,782 | A | 11/1999 | Inoue |
| 6,027,115 | A | 2/2000 | Griswold et al. |
| 6,086,066 | A | 7/2000 | Takeuchi et al. |
| 6,089,977 | A | 7/2000 | Bennett |
| 6,117,013 | A | 9/2000 | Eiba |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,409,602 | B1 | 6/2002 | Wiltshire et al. |
| 6,413,162 | B1 | 7/2002 | Baerlocher et al. |
| 6,419,579 | B1 | 7/2002 | Bennett |
| 6,517,433 | B2 | 2/2003 | Loose et al. |
| 6,565,433 | B1 | 5/2003 | Baerlocher et al. |
| 6,616,142 | B2 * | 9/2003 | Adams .......................... 273/292 |
| 6,634,945 | B2 | 10/2003 | Glavich et al. |
| 6,676,511 | B2 | 1/2004 | Payne et al. |
| 6,726,204 | B2 | 4/2004 | Inoue |
| 6,731,313 | B1 | 5/2004 | Kaminkow |
| 6,835,133 | B2 | 12/2004 | Baerlocher et al. |
| 6,855,054 | B2 | 2/2005 | White et al. |
| 6,880,826 | B2 | 4/2005 | Inoue |
| 6,923,441 | B2 | 8/2005 | Inoue |
| 6,932,700 | B2 | 8/2005 | Bennett et al. |
| 6,942,572 | B2 | 9/2005 | Inoue |
| 6,960,133 | B1 | 11/2005 | Marks et al. |
| 6,976,915 | B2 | 12/2005 | Baker et al. |
| 6,981,635 | B1 | 1/2006 | Hughs-Baird et al. |
| 7,001,274 | B2 | 2/2006 | Baerlocher et al. |
| 7,014,560 | B2 | 3/2006 | Glavich et al. |
| 7,056,213 | B2 | 6/2006 | Ching et al. |
| 7,070,502 | B1 * | 7/2006 | Bussick et al. .................. 463/20 |
| 7,074,127 | B2 | 7/2006 | Cuddy et al. |
| 7,090,580 | B2 | 8/2006 | Rodgers et al. |
| 7,094,148 | B2 | 8/2006 | Baerlocher et al. |
| 7,144,322 | B2 | 12/2006 | Gomez et al. |
| 7,160,187 | B2 | 1/2007 | Loose et al. |
| 7,204,753 | B2 | 4/2007 | Ozaki et al. |
| 7,252,591 | B2 | 8/2007 | Van Asdale |
| 7,275,988 | B2 | 10/2007 | Aida et al. |
| 2002/0077165 | A1 | 6/2002 | Bansemer et al. |
| 2002/0193160 | A1 * | 12/2002 | Tarantino ........................ 463/20 |
| 2003/0054874 | A1 | 3/2003 | Kaminkow |
| 2003/0057645 | A1 | 3/2003 | Baerlocher et al. |
| 2003/0060267 | A1 | 3/2003 | Glavich et al. |
| 2004/0033829 | A1 | 2/2004 | Pacey et al. |
| 2004/0048650 | A1 | 3/2004 | Mierau et al. |
| 2004/0242313 | A1 | 12/2004 | Munoz |
| 2005/0059477 | A1 | 3/2005 | Baerlocher |
| 2005/0059478 | A1 | 3/2005 | Peterson et al. |
| 2005/0064924 | A1 * | 3/2005 | Glavich et al. .................. 463/13 |
| 2005/0192081 | A1 | 9/2005 | Marks et al. |
| 2005/0282620 | A1 | 12/2005 | Marks et al. |
| 2005/0288094 | A1 | 12/2005 | Marks et al. |
| 2006/0019738 | A1 | 1/2006 | Baerlocher et al. |
| 2006/0040728 | A1 | 2/2006 | Fuller |
| 2006/0046830 | A1 | 3/2006 | Webb |
| 2006/0068884 | A1 | 3/2006 | Baerlocher et al. |
| 2006/0068885 | A1 | 3/2006 | Cregan et al. |
| 2006/0073872 | A1 | 4/2006 | B-Jensen et al. |
| 2006/0084492 | A1 | 4/2006 | Baerlocher et al. |
| 2006/0084498 | A1 | 4/2006 | Baerlocher et al. |
| 2006/0111174 | A1 | 5/2006 | Baerlocher et al. |
| 2006/0116195 | A1 | 6/2006 | Baerlocher et al. |
| 2006/0135247 | A1 | 6/2006 | Baerlocher et al. |
| 2006/0172795 | A1 | 8/2006 | Bussick et al. |
| 2006/0199636 | A1 | 9/2006 | Ching et al. |
| 2006/0199637 | A1 | 9/2006 | Ching et al. |
| 2007/0004489 | A1 | 1/2007 | Rodgers et al. |
| 2007/0010316 | A1 | 1/2007 | Baerlocher et al. |
| 2007/0021175 | A1 | 1/2007 | Rodgers et al. |
| 2007/0021188 | A1 | 1/2007 | Rodgers et al. |
| 2007/0060246 | A1 | 3/2007 | Baerlocher et al. |
| 2007/0060294 | A1 | 3/2007 | Cuddy et al. |

FOREIGN PATENT DOCUMENTS

| | | |
|---|---|---|
| EP | 1 063 622 | 12/2000 |
| GB | 1 454 046 | 10/1976 |
| GB | 2 062 922 | 5/1981 |
| GB | 2 106 293 | 9/1981 |
| GB | 2 097 160 | 10/1982 |
| GB | 2 106 295 | 4/1983 |
| GB | 2 165 385 | 4/1986 |
| GB | 2 243 236 | 4/1990 |
| GB | 2 372 132 | 2/2001 |
| WO | WO 98/20949 | 5/1998 |
| WO | WO 00/30727 | 6/2000 |
| WO | WO 2007/053349 | 5/2007 |

OTHER PUBLICATIONS

50 Lions, written by videoslotmachines.com, published prior to 2007.

* cited by examiner

GAMING SYSTEM, GAMING DEVICE AND GAMING METHOD PROVIDING STACKING SYMBOLS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. Known slot gaming device includes a plurality of reels and one or more paylines. Such known gaming devices typically include a suitable number of reels, such as three to five reels, which each display a suitable number of symbols per reel, such as three symbols per reel, wherein each reel includes one symbol displayed in each of a plurality of symbol positions on that reel. Such gaming devices may have one, three, five, nine, fifteen, twenty-five or any other suitable number of paylines which are horizontal, vertical, diagonal or any combination thereof.

In certain known slot gaming machines, upon placing one or more wagers, the reels spin to generate a plurality of symbols and the gaming device analyzes the generated symbols to determine if the gaming device has randomly generated a winning symbol or winning symbol combination on or along one or more of the wagered on paylines. Any awards associated with any generated winning symbols or winning symbol combinations generated along any wagered on paylines are provided to the player. Alternatively, any awards associated with any winning symbols or winning symbol combinations that are generated anywhere on a wagered on payline (i.e., a line scatter pay) or anywhere on the reels (i.e., a reel scatter pay) are provided to the player.

In these known gaming machines, the amount of the wager made on the base game by the player may vary. For instance, the gaming machine may enable the player to wager a minimum number of credits, such as one credit (e.g., one penny, nickel, dime, quarter or dollar) up to a maximum number of credits, such as five credits. In one known slot gaming device, the player wagers on a number or combination of paylines, such as one, two, three, five, ten or fifteen paylines. Thus, it is known that a gaming machine, such as a slot game, may enable players to make wagers of substantially different amounts on each play of the primary or base game ranging, for example, from 1 credit up to 125 credits (e.g., 5 credits on each of 25 separate paylines). Accordingly, it should be appreciated that different players play at substantially different wagering amounts or levels and at substantially different rates of play.

One problem for certain players is that multiple payline reel games become less volatile with each additional payline wagered on. Game designers typically provide lower payouts to compensate for more frequent occurrences of winning symbol combinations that result in an award to the player. Some players want increased volatility to maintain large payouts, but also want to wager on every payline for the most opportunities to win an award.

Symbol stacking in a reel game is also known. Symbol stacking is implemented by forming stacks of identical symbols on a single reel. The stacks of symbols are formed by placing a plurality of identical symbols adjacent to each other on a single reel of a reel gaming machine. The identical symbols on the same single reel are adjacent to each other, and thus "stacked". For example, four cherry symbols will appear adjacent to each other on a reel to form a stack of four cherry symbols. Stacks of symbols are similarly formed on each of the reels in the reel gaming machine. In one known slot gaming device, if a stack of symbols is formed on a first reel, an identical stack of symbols is also formed on the other reels. Thus, when a gaming machine generates stacks of symbols that are identical on three or more adjacent reels, multiple winning symbol combinations can be formed and the gaming machine can provide large payouts to the player.

One known issue with using stacked symbols is if a reel generates a stack of symbols, the generated stack of symbols may block or otherwise prevent the formation of any winning symbol combinations. One prior art symbol stacking game with the blocking problem is illustrated in Prior Art FIG. 3, wherein a first reel (i.e., first reel on the left) generates a stack of cherry symbols, a second reel (i.e., second reel from the left) generates a stack of bar symbols, and a third reel (i.e., third reel from the left) generates a stack of cherry symbols. If at least three identical symbols must be generated along a payline to win an award, the stack of bar symbols prevents the formation of any winning symbol combinations including the cherry symbols. That is, the stack of bar symbols generated on the second reel blocked any of the cherry symbols in the first and third reels from forming any winning symbol combinations. The player therefore did not achieve a winning symbol combination on any of the wagered on paylines. Therefore, there is a need to provide greater volatility in multiple payline games while minimizing the effects of blocking.

SUMMARY

The gaming system, gaming device and method disclosed herein provides a reel game that includes stacks of symbols configured on the reels to minimize the blocking effect often associated with stacks of symbols. The gaming device includes a plurality of reels wherein each reel includes a plurality of symbols. The plurality of reels can be configured to include one or more stacks of symbols, wherein a stack of symbols includes a plurality of a designated symbol which are positioned adjacent to each other on a single reel or reel strip. For example, a stack of cherry symbols is formed from two identical cherry symbols positioned adjacent to each other on the same reel strip. In one embodiment, different reels include different quantities of symbols per symbol stack. In one such embodiment, the gaming device is configured such that each subsequent reel includes a quantity of stacked symbols that is equal to or greater than the quantity of stacked symbols on the previous reel.

In one embodiment, a first reel of the gaming device includes a plurality of symbols and a first quantity of a designated symbol. For example, the gaming device includes twenty-two symbols positions on a reel strip of the first reel, wherein at least one of the symbols at one of the symbol positions is a cherry symbol (i.e., the designated symbol) and the remaining symbols are other non-stacked, non-designated symbols. A second reel of the gaming device includes a plurality of symbols and at least one stack of a plurality of the designated symbol, wherein the quantity of symbols which form the stack of symbols on the second reel is greater than the first quantity of the designated symbol. For example, the gaming device includes twenty-two symbol positions on a reel strip of the second reel, wherein at least two of the symbols at two adjacent symbol positions are stacked cherry symbols while the remaining symbols are non-stacked symbols. A third reel of the gaming device includes a plurality of symbols and at least one stack of a plurality of the designated symbol, wherein the quantity of symbols which form the stack of symbols on the third reel is equal to or greater than the second quantity of symbols which forms the stack of symbols on the second reel. For example, the gaming device includes twenty-two symbol positions on a reel strip of the third reel, wherein at least three of the symbols at three adjacent symbol positions are stacked cherry symbols while the remaining symbols are non-stacked symbols. A fourth reel of the gaming device includes a plurality of symbols and at least one stack of a plurality of the designated symbol, wherein the quantity of symbols which form the stack of symbols on the fourth reel is equal to or greater than the second and third quantities of symbols which form the stacks of symbols on the second and third reels.

It should be appreciated that this configuration of different quantities of stacked symbols on different reels minimizes the effects of blocking. That is, providing incrementally larger stacks of symbols on adjacent reels minimizes the effects of blocking because if a plurality of the reels of the gaming device generate stacks of symbols with increasingly larger quantities of the designated symbol, certain of the reels can also generate non-stacking symbols in addition to the generated stacks of symbols (i.e., symbols different from the symbols used to form the stack of symbols). Such a configuration provides that winning symbol combinations including the non-stacked symbols can be formed across adjacent reels even if each reel generated a stack of symbols.

Utilizing the example of a plurality of reels described above, a player initiates a play of the game and the first reel generates and displays a designated cherry symbol and three non-stacked symbols; the second reel generates two stacked cherry symbols and two non-stacked symbols; the third reel generates three stacked cherry symbols and one non-stacked symbol; and the fourth reel generates a stack of four cherry symbols (and therefore does not generate a non-stacking symbol). In this example, based on the generation of stacked and non-stacked symbols, the stacks of cherry symbols with increasingly larger quantities of cherry symbols can form multiple winning symbol combinations. Additionally, because the reels also generated non-stacked symbols on the first, second, and third reels, the non-stacked symbols could also form at least one winning symbol combination. That is, if at least three adjacent reels can generate non-stacked symbols in addition to a stack of symbols, the stacks of symbols are less likely to completely block the formation of winning symbol combinations because other winning symbol combinations can still be formed from non-stacked symbol combinations. Therefore, the stacks of symbols with increasingly larger quantities of symbols creates an opportunity to form winning symbol combinations even if one or more reels generated a stack of symbols.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION

The present disclosure may be implemented in various configurations for gaming machines, gaming devices or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
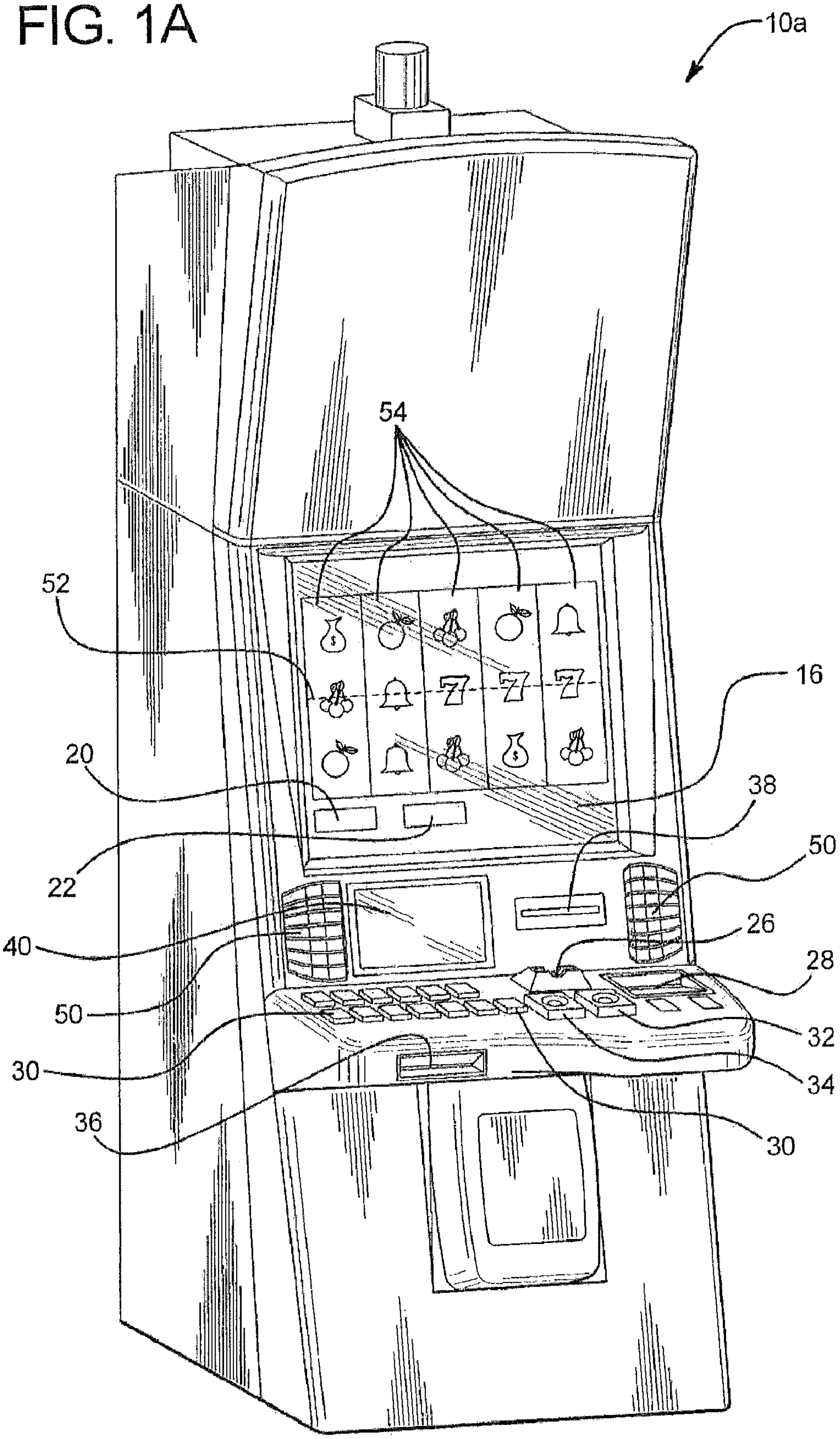
FIG. 1A is a front-side perspective view of one embodiment of the gaming device disclosed herein.
Figure 1B:
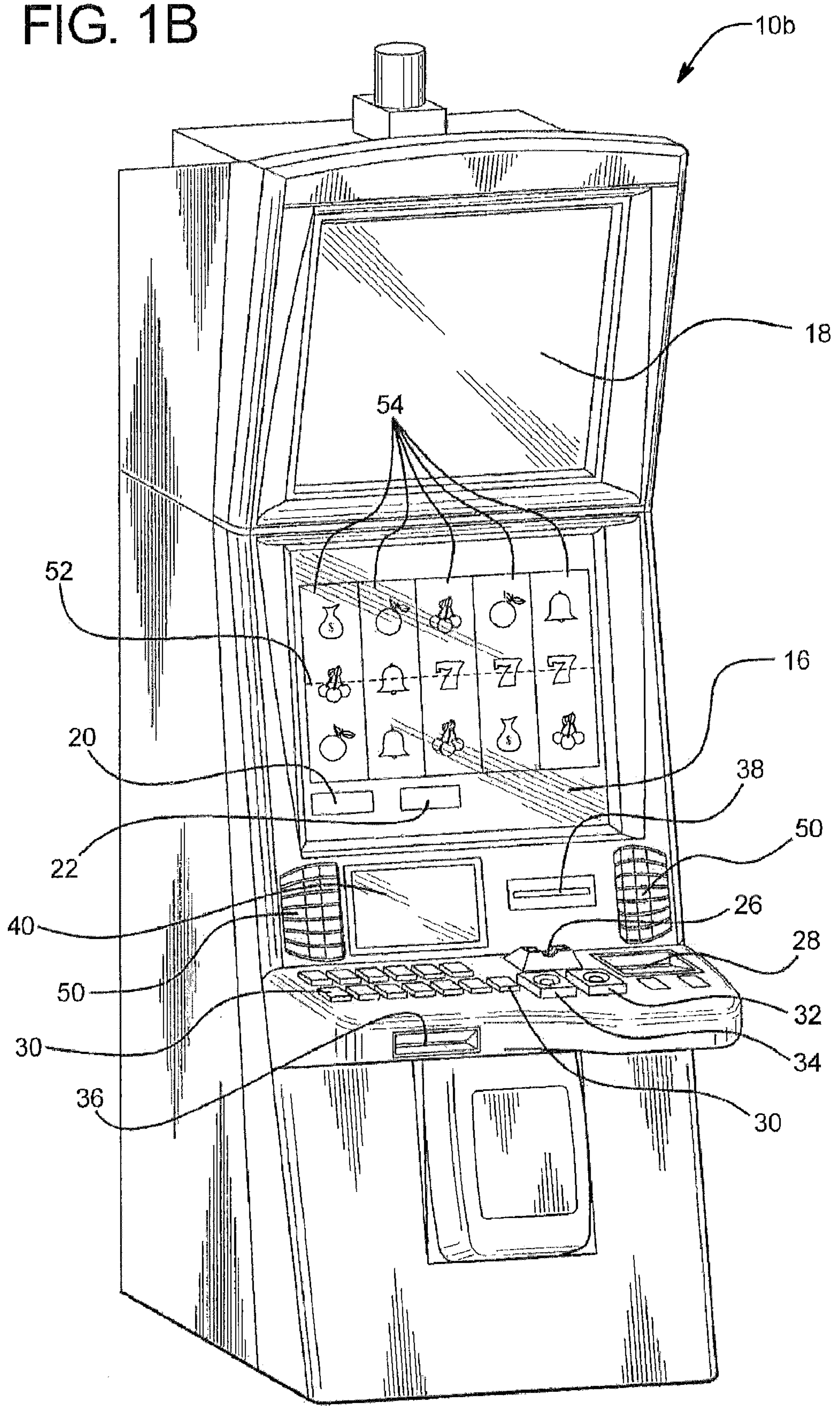
FIG. 1B is a front-side perspective view of another embodiment of the gaming device disclosed herein.

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
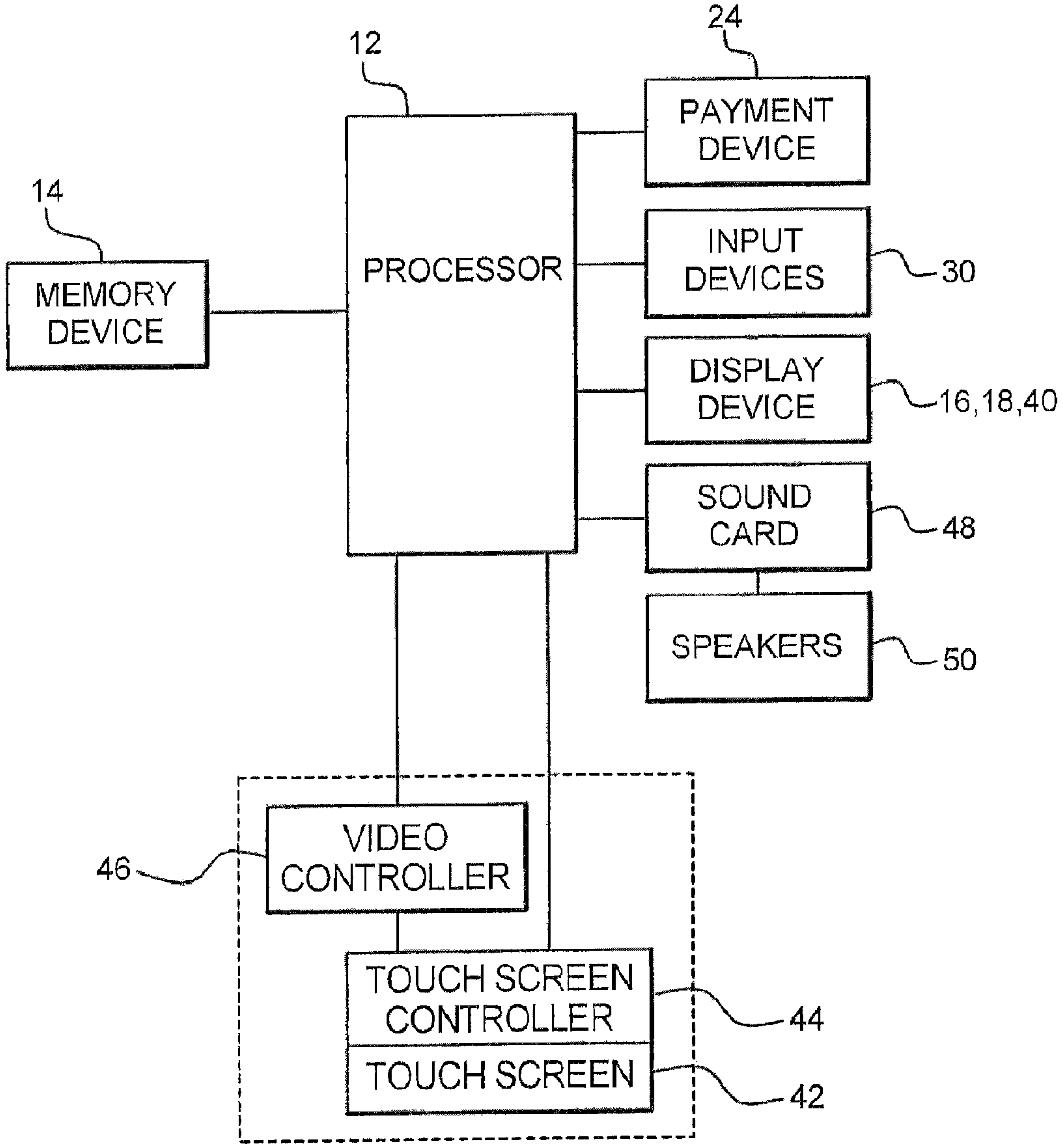
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game, wherein the game including stacks of symbols can be incorporated as a secondary or bonus game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels or reels, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. In this embodiment, the game including stacks of symbols can be incorporated as a secondary or bonus game. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker, wherein the game including stacks of symbols can be incorporated as a secondary or bonus game. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices and the game including stacks of symbols can be incorporated as a secondary or bonus game. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
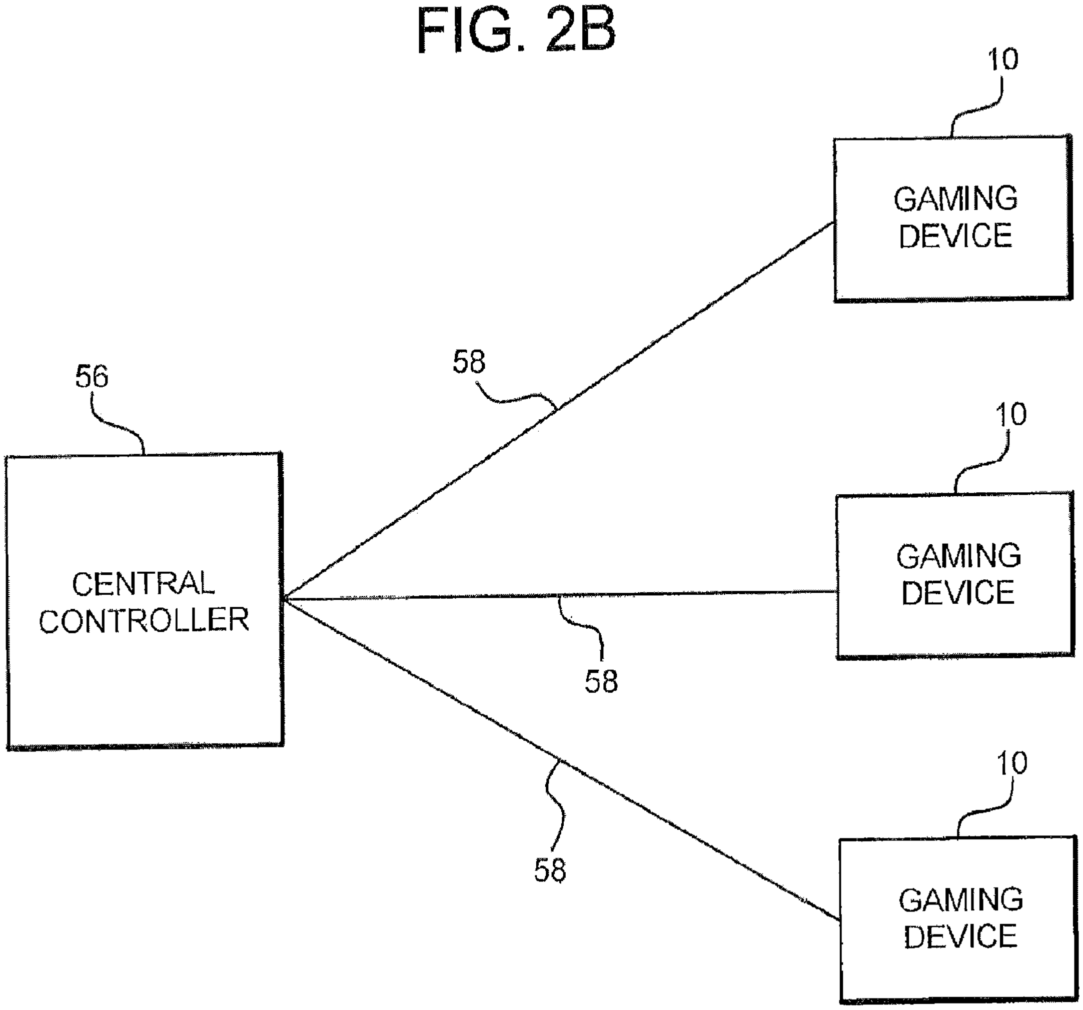
FIG. 2B is a schematic block diagram illustrating a plurality of gaming terminals in communication with a central controller.
Figure 3:
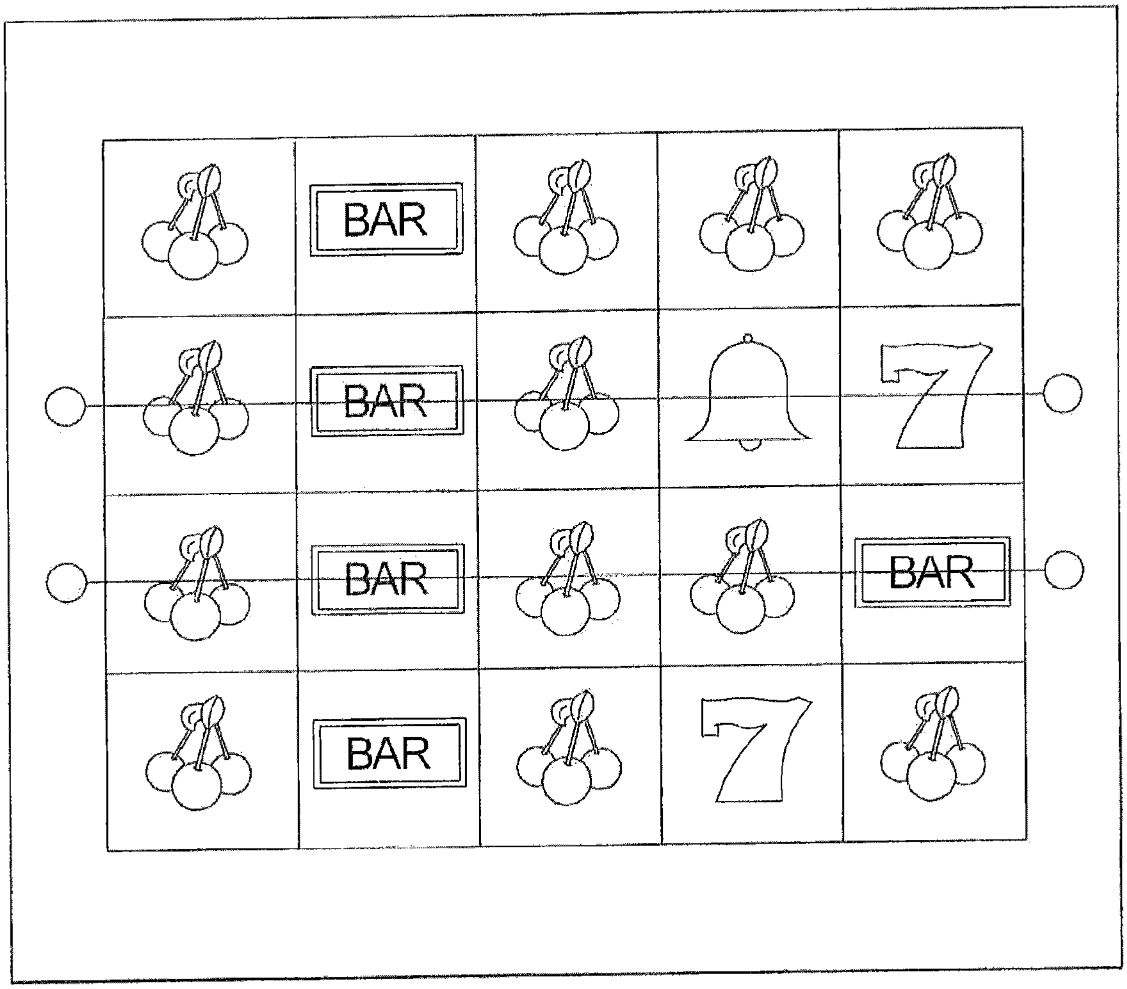
FIG. 3 (Prior Art)
FIG. 3 is a Prior Art gaming device illustrating a reel game including symbol stacks and the effects of blocking.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first win outcome of $10 which will be provided to a first player regardless of how the first player plays in a first game and a second gaming device to have selected elements marked in a different predetermined pattern is provided a second win outcome of $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Symbol Stacks

Figure 4:
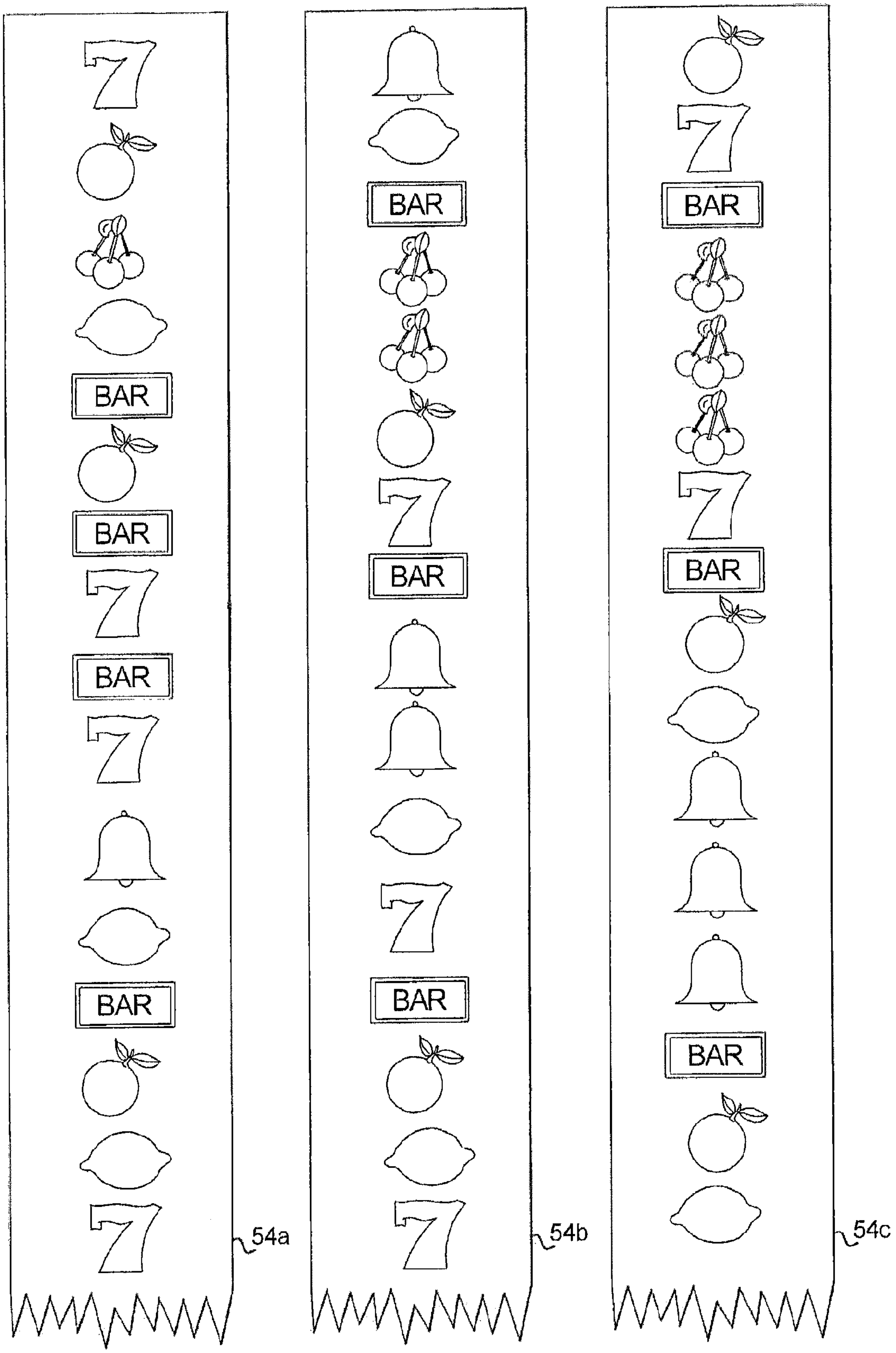
FIG. 4 is an elevation view of one embodiment of the gaming device disclosed herein illustrating a plurality of reels including a plurality of symbols and stacked symbols configured on the reels.

Turning now to FIG. 4, one embodiment of the reel configuration of the present disclosure is illustrated. The gaming device includes reels 54*a*, 54*b*, and 54*c*, wherein each reel includes a plurality of symbol positions (i.e., 22 positions or any suitable number of positions) on a reel strip and a plurality of symbols. In one embodiment, reel 54*a*, 54*b*, and 54*c* can each be configured to include one or more stacks of symbols, wherein a stack of symbols is formed by placing a plurality of a designated symbol adjacent to each other on the same reel.

As seen in FIG. 4, reel 54*a* includes one cherry symbol at one symbol position as a designated cherry symbol and one bell symbol at another symbol position as a designated bell symbol, wherein the remaining symbols are other non-stacked symbols. Reel 54*b* includes two cherry symbols at two adjacent symbol positions to form a stack of two cherry symbols and two bell symbols at two adjacent symbol positions to form a stack of two bell symbols while the remaining symbols are non-stacked symbols. In one embodiment, the quantity of stacked cherry symbols and the quantity of stacked bell symbols displayed on reel 54*b* are equal to or greater than the quantity of designated symbols on reel 54*a*. Reel 54*c* includes three cherry symbols at three adjacent symbol positions to form a stack of three cherry symbols and three bell symbols at three adjacent symbol positions to form a stack of three bell symbols. In one embodiment, the quantity of stacked cherry symbols and quantity of stacked bell symbols on reel 54*c* are each greater than the quantity of stacked symbols on reel 54*a* and/or reel 54*b*. Thus, this configuration provides different quantities of two different designated symbols on each reel.

In one embodiment, the gaming device can include any number of reels. In one such embodiment, the gaming device includes more than three reels. For each subsequent reel included in the gaming device, the subsequent reel includes a plurality of symbols and at least one stack of symbols, wherein the quantity of symbols which form the stack of symbols on each subsequent reel is greater than the quantity of symbols which form the stack of symbols on each of the previous reels. Therefore, each subsequent reel can include stacks of symbols with increasingly larger quantities of symbols than included on the previous reels.

It should be appreciated that this configuration of stacks of symbols with increasingly larger quantities of symbols minimizes the effects of blocking because each reel 54*a*, 54*b*, and 54*c* can be configured to generate a designated symbol or a stack of the designated symbol as well as non-stacked symbols. If reel 54*a*, 54*b*, and 54*c* each generated an identical non-stacked symbol, then the identical non-stacked symbols could form a winning symbol combination. That is, even if each reel generated a stack of symbols, at least one winning symbol combination can still be formed across reels 54*a*, 54*b*, and 54*c* because each reel also generated at least one non-stacked symbol. Therefore, the stacks of symbols with increasingly larger quantities of symbols minimizes the effects of blocking because the reels can generate a designated symbol or a stack of symbols with non-stacked symbols, wherein the non-stacked symbols can form winning symbol combinations.

Figure 5:
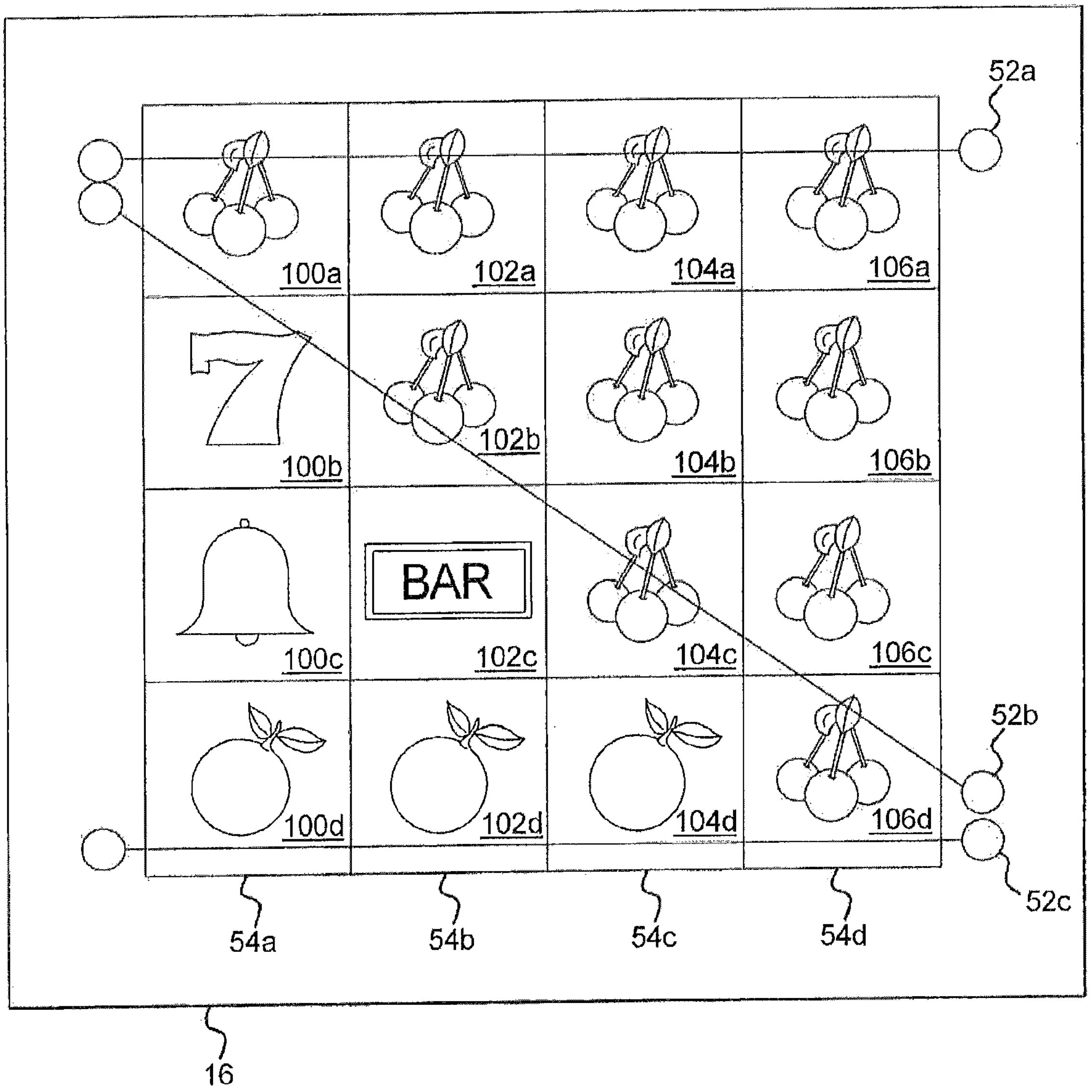
FIG. 5 is an elevation view of one embodiment of the gaming device disclosed herein illustrating a reel game including a plurality of reels and one generation of the game including stacks of symbols that incrementally increase in size between each reel.

In the embodiment illustrated in FIG. 5, the gaming device includes reels 54*a*, 54*b*, 54*c*, and 54*d* that can each generate four symbol positions. In one embodiment, the reels 54*a*, 54*b*, 54*c*, and 54*d* can be configured to include one or more stacks of symbols, wherein a stack of symbols is formed by placing a plurality of a designated symbol adjacent to each other on a single reel. As described above, reels 54*a*, 54*b*, 54*c*, and 54*d* can include different quantities of the designated symbol, wherein the different quantities of symbols includes an incrementally larger stack of symbols on each respective reel.

In this embodiment, reel 54*a* generated a designated cherry symbol 100*a* and non-stacked seven symbol 100*b*, bell symbol 100*c*, and orange symbol 100*d*. Reel 54*a* generated the three non-stacked symbols because three non-stacked symbol positions remained after generating the designated one cherry symbol. Reel 54*b* generated two stacked cherry symbols 102*a* and 102*b* and non-stacked bar symbol 102*c* and orange symbol 102*d*. Reel 54*b* generated the two non-stacked symbols because two non-stacked symbol positions remained after generating the stack of two cherry symbols. Reel 54*c* generated three stacked cherry symbols 104*a*, 104*b*, and 104*c* and non-stacked orange symbol 104*d*. Reel 54*c* generated the one non-stacked symbol because one non-stacked symbol position remained after generating the stack of three cherry symbols. Reel 54*d* generated four stacked cherry symbols 106*a*, 106*b*, 106*c*, and 106*d* and no non-stacked symbols. Reel 54*d* did not generate any non-stacked symbols because the stack of four cherry symbols is equal to the generated four displayed symbol positions. Each reel 54*a* to 54*d* respectively generated an incrementally larger quantity of the designated cherry symbol, wherein each stack of cherry symbols on reels 54*b*, 54*c*, and 54*d* is greater than the stack on the previous reel. By generating stacks of symbols with increasingly larger quantities of the designated symbol, reels 54*b* and 54*c* were each enabled to generate at least one non-stacked symbol.

Display device 16 displays a plurality of a player's wagered on paylines. In one embodiment, winning outcomes are formed when a payline passes through at least three identical symbols on three adjacent reels. In the illustrated embodiment, the player wagered on paylines 52*a*, 52*b*, and 52*c*. Payline 52*a* passed through cherry symbols 100*a*, 102*a*, 104*a*, and 106*a* on reels 54*a*, 54*b*, 54*c*, and 54*d* respectively. Payline 52*a* passed through a symbol combination including at least three identical cherry symbols on three adjacent reels, thus the player wins an award for this symbol combination. Payline 52*b* passed through cherry symbols 100*a*, 102*b*, 104*c*, and 106*d* on reels 54*a*, 54*b*, 54*c*, and 54*d* respectively. Payline 52*b* passed through a symbol combination including at least three identical cherry symbols on three adjacent reels, thus the player also wins an award for this symbol combination. Payline 52*c* passed through orange symbols 100*d*, 102*d*, 104*d*, and cherry symbol 106*d* on reels 54*a*, 54*b*, 54*c*, and 54*d* respectively. Payline 52*c* passed through a symbol combination including three identical orange symbols on three adjacent reels, thus the player wins an award for this symbol combination. The gaming device therefore provided a plurality of awards in one play of a multiple payline gaming device because the player won three awards based on the player's three wagered on paylines. It should be appreciated that in one embodiment, the player could have won an even larger number of awards due to the stacks of symbols with increasingly larger quantities of cherry symbols. If the player had wagered on more than three paylines, the stacks of cherry symbols on adjacent reels would have enabled the player to form an even larger number of winning cherry symbol combinations.

It should also be appreciated that stacks of symbols with increasingly larger quantities of symbols on each adjacent reel minimizes the effects of blocking. Reels 54*a* to 54*d* were each configured to generate four symbols. However, the quantity of the designated symbol generated on each reel 54*a* to 54*c* was configured to be smaller than the number of generated symbols on each reel. Thus, when reels 54*a* to 54*c* each generated a quantity of the designated symbol, each reel 54*a* to 54*c* also generated at least one non-stacked symbol. The generated non-stacked symbols prevented any of the stacks of symbols from completely blocking the formation of another winning symbol combination. Enabling reels 54*a* to 54*c* to generate non-stacked symbols created additional opportunities to form winning symbol combinations that were not blocked by a stack of symbols. In the illustrated embodiment, reels 54*a* to 54*c* respectively generated orange symbols 100*d*, 102*d*, 104*d* along payline 52*c* to form a winning outcome. Thus, generating stacks of symbols with increasingly larger quantities of cherry symbols minimizes the effects of blocking because the stacks of cherry symbols did not block the formation of another winning outcomes.

In an alternative embodiment of FIG. 5 where the reels 54*a*, 54*b*, 54*c*, and 54*d* each generated a quantity of designated symbols, but one or more of the reels generated a different stack of symbols, the stacks of symbols with increasingly larger quantities of symbols will still minimizes the effects of blocking. For example, if reel 54*c* generated a stack of three lemon symbols in place of cherry symbols 104*a*, 104*b*, and 104*c*, the player would not have formed a winning outcome along paylines 52*a* and 52*b*. The stack of lemon symbols would have blocked the formation of three or more adjacent cherry symbols. However, because reel 54*c* also generated one non-stacked symbol (orange symbol 104*d*), the stack of lemon symbols did not completely block the formation of a winning outcome. Because reels 54*a* to 54*c* generated orange symbols 100*d*, 102*d*, 104*d*, the orange symbols would still form a winning outcome along payline 52*c* despite the stack of lemon symbols. Thus, the stacks of symbols with increasingly larger quantities of symbols minimizes the effects of a generated stack of symbols blocking the formation of a winning outcome.

Figure 6A:
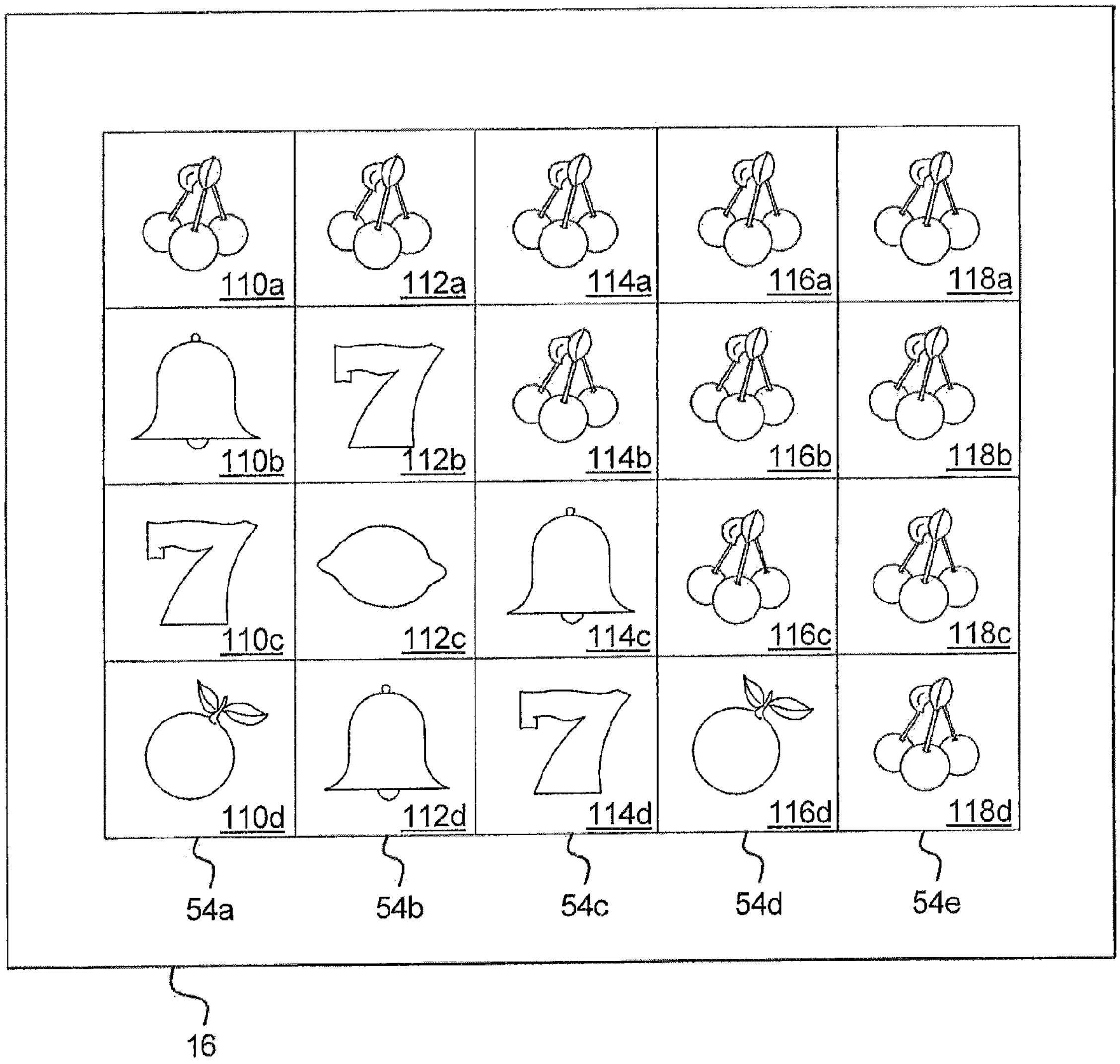
FIGS. 6A, 6B, and 6C are elevation views of different embodiments of the gaming device disclosed herein illustrating a reel game including a plurality of reels and different generations of symbols that display stacks of symbols in different arrangements on each reel.

In one embodiment, the quantity of a designated symbol that is generated on each reel is equal on at least two adjacent reels. In one such embodiment, a first and second reel generate equal quantities of a designated symbol, while subsequent reels generate increasing larger quantities of the designated symbol. As illustrated in FIG. 6A, reel 54*a* generated a designated cherry symbol 110*a* and non-stacked bell symbol 110*b*, seven symbol 110*c*, and orange symbol 110*d*. Reel 54*b* generated a designated cherry symbol 112*a*, and non-stacked seven symbol 112*b*, lemon symbol 112*c*, and bell symbol 112*d*. Reel 54*c* generated two stacked cherry symbols 114*a* and 114*b* and non-stacked bell symbol 114*c* and seven symbol 114*d*. Reel 54*d* generated three stacked cherry symbols 116*a*, 116*b*, and 116*c* and non-stacked orange symbol 116*d*. Reel 54*e* generated four stacked cherry symbols 118*a*, 118*b*, 118*c*, and 118*d* and no non-stacked symbols.

Figure 6B:
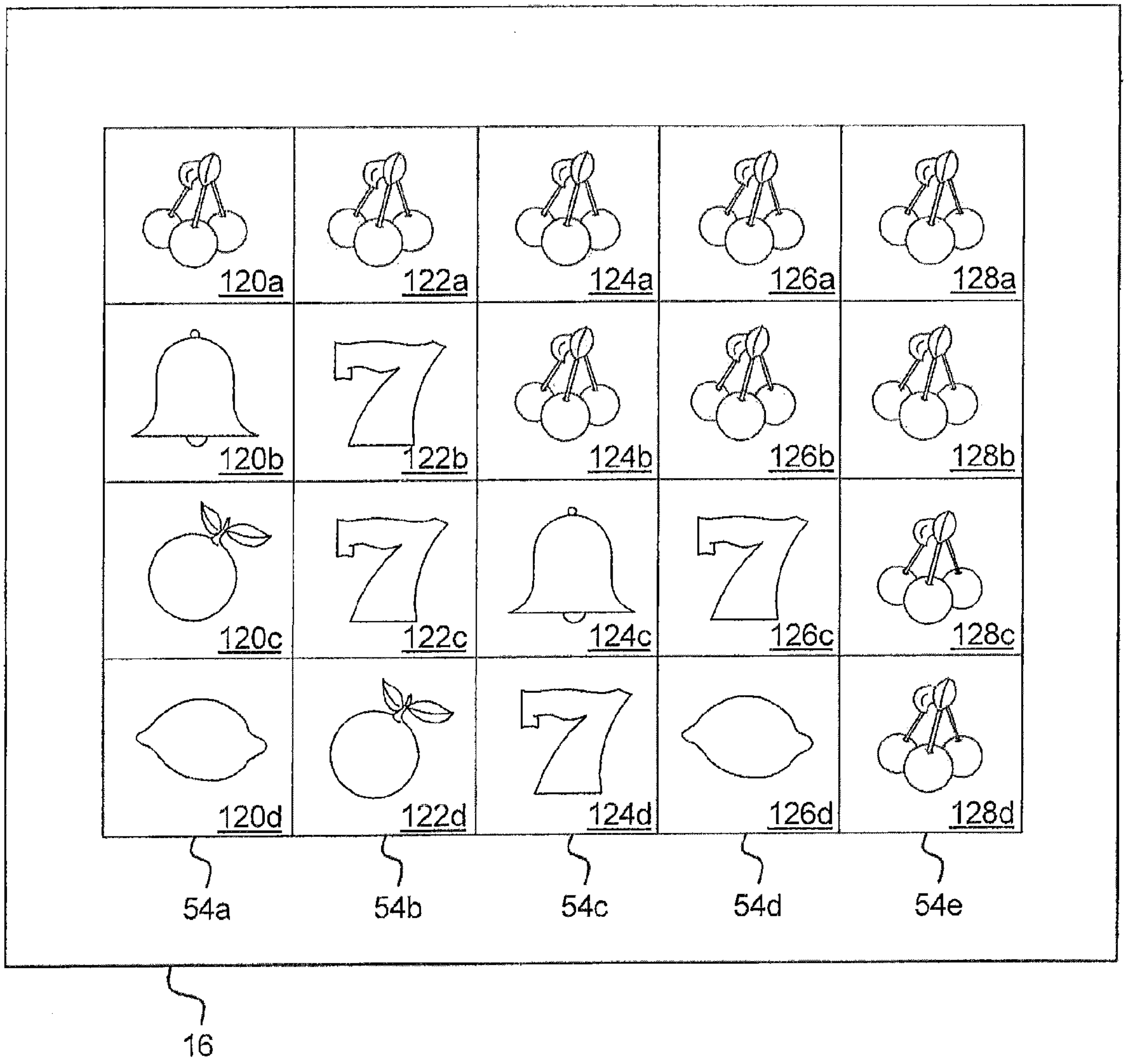
Figure 6C:
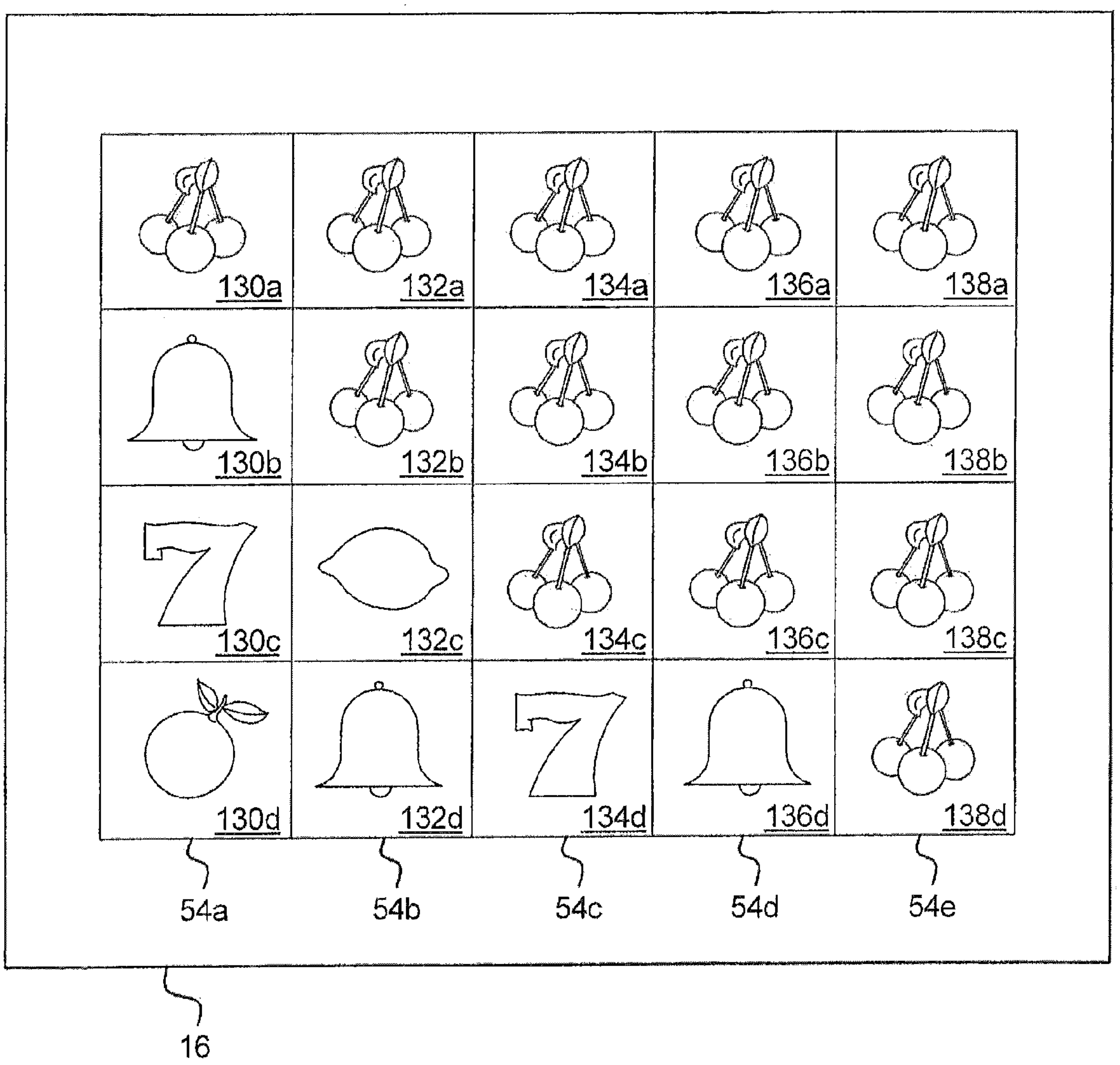

In an alternative embodiment, the quantity of a designated symbol in a stack of symbols is equal on at least two adjacent reels. In one example as illustrated in FIG. 6B, reel 54*a* generated a designated cherry symbol 120*a* and non-stacked seven symbol 120*b*, orange symbol 120*c*, and lemon symbol 120*d*. Reel 54*b* generated a designated cherry symbol 122*a*, and non-stacked bell symbol 122*b*, seven symbol 122*c*, and orange symbol 122*d*. Reel 54*c* generated two stacked cherry symbols 124*a* and 124*b* and non-stacked bell symbol 124*c* and seven symbol 124*d*. Reel 54*d* generated two stacked cherry symbols 126*a* and 126*b*, and non-stacked seven symbol 126*c* and lemon symbol 126*d*. Reel 54*e* generated four stacked cherry symbols 128*a*, 128*b*, 128*c*, and 128*d* and no non-stacked symbols. In another example as illustrated in FIG. 6C, reel 54*a* generated a designated cherry symbol 130*a* and non-stacked bell symbol 130*b*, seven symbol 130*c*, and orange symbol 130*d*. Reel 54*b* generated a stack of two cherry symbols 132*a* and 132*b*, and non-stacked lemon symbol 132*c*, and bell symbol 132*d*. Reel 54*c* generated three stacked cherry symbols 134*a*, 134*b*, and 134*c*, and non-stacked seven symbol 134*d*. Reel 54*d* generated three stacked cherry symbols 136*a*, 136*b*, and 136*c* and non-stacked bell symbol 136*d*. Reel 54*e* generated four stacked cherry symbols 138*a*, 138*b*, 138*c*, and 138*d* and no non-stacked symbols.

In one embodiment, the quantity of a designated symbol that forms a stack of symbols on one reel does not have to incrementally increase for each subsequent and adjacent reel. In one example embodiment, a first reel includes one designated symbol, a second reel includes a stack of three of the designated symbols, and a third reel includes a stack of six of the designated symbols. Thus, in one embodiment, quantities of the designated symbol that form the stacks of symbols do not incrementally increase between reels. In another such embodiment, the quantity of a designated symbol on each reel can be greater than, less than, or equal to the previous reel. For example, in a four reel gaming device, a first reel includes a stack of three of a designated symbol, a second reel includes a stack of two of the designated symbols, a third reel includes a stack of two the designated symbols, and a fourth reel includes a stack of three of the designated symbols. Thus, in this example, the quantity of symbols that forms the stack of symbols decrease from the first reel to the second reel, and the quantities of the designated symbol that form the stacks of symbols on the second and third reels are equal. It should be appreciated that these configurations still minimize the effects of blocking. That is, as long as the stack of symbols on each reel is smaller than the number of symbols that each reel generates, each reel can still generate stacks of symbols as well as non-stacking symbols. The benefits provided by winning outcomes formed from non-stacked symbols would still be present. Thus, the quantity of symbols that form a stack of symbols may vary, wherein the quantity of symbols that form a stack of symbols on a subsequent reel does not have to be equal to or greater than the quantity of symbols that form a stack of symbols on a previous reel.

In one embodiment including a plurality of reels that generated stacks of symbols, awards associated with winning symbol combinations are determined based on evaluating the winning symbol combinations from the left most reel to the right most reel. In an alternative embodiment, the awards associated with winning symbol combinations are determined based on evaluating the winning symbols combinations from the right most reel to the left most reel. In one embodiment, wherein the quantities of symbols that form stacks of symbols increases from the left most reel to the right most reel, determining awards associated with winning symbol combinations based on a left to right analysis provides greater award opportunities.

Figure 7:
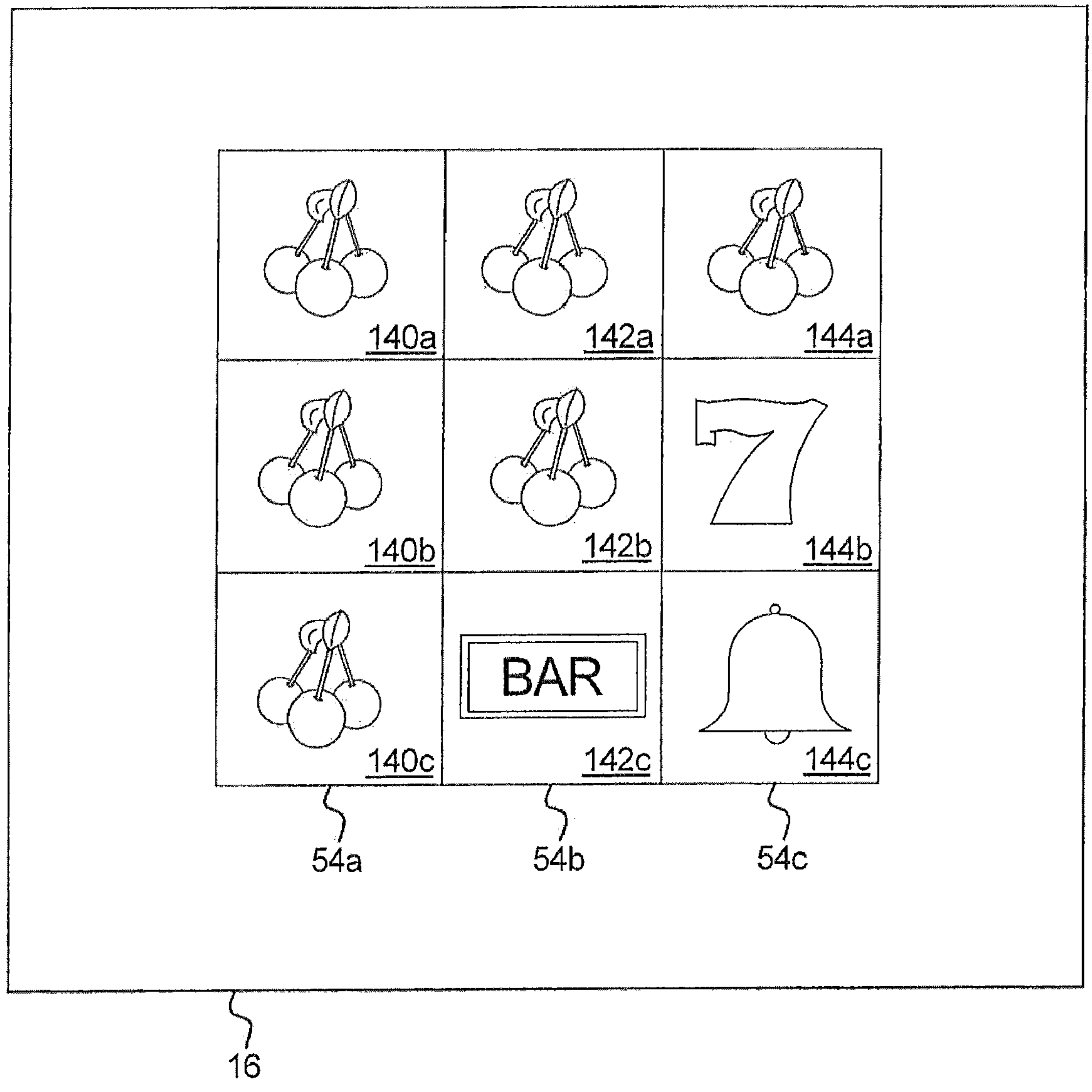
FIG. 7 is an elevation view of one embodiment of the gaming device disclosed herein illustrating a reel game including a plurality of reels and one generation of symbols including stacks of symbols that incrementally increase in size from the right most reel to the left most reel.

In one embodiment, the quantity of a designated symbol that forms a stack of symbols increases for each subsequent and adjacent reel starting from a right most reel to a left most reel. In one example embodiment, as illustrated in FIG. 7, reel 54*c* generated a designated cherry symbol 144*a* and non-stacked seven symbol 144*b*, and bell 144*c*. Reel 54*b* generated two stacked cherry symbols 142*a* and 142*b*, and non-stacked bar symbol 142*c*. Reel 54*a* generated three stacked cherry symbols 140*a*, 140*b*, and 140*c*.

In one such embodiment, wherein the quantities of symbols that form stacks of symbols increases from the right most reel to the left most reel, determining awards associated with winning symbol combinations based on a right to left analysis provides greater award opportunities. In one such embodiment, wherein the quantities of symbols that form stacks of symbols increases from the right most reel to the left most reel, the awards associated with winning symbol combinations are determined based on a left to right analysis for a first wager amount and the awards associated with winning symbol combinations are determined based on a right to left analysis for a second wager amount that is greater than the first wager amount. Thus, in this embodiment the second wager amount enables the gaming device to determine awards associated with winning symbol combinations in a manner that provides greater award opportunities for the player.

In another embodiment, each reel can be configured to include a different number of stacks of symbols. In one such embodiment, a first reel includes one stack of two cherry symbols, while a second reel may include a stack of two cherry symbols and a stack of two lemon symbols. In another embodiment, each reel can be configured to include a different number of stacks of symbols, wherein the quantities of symbols that forms the stacks of symbols on each reel can also vary. For example, a first reel may include one stack of two cherry symbols and a stack of three bell symbols, while a second reel may include a stack of three cherry symbols, a stack of three bell symbols, and a stack of two lemon symbols.

In another embodiment, a reel including a particular configuration of symbols (i.e., the configuration of stacked and non-stacked symbols) that is utilized with the gaming device is predetermined. In alternative embodiments, a reel including a particular configuration of symbols that is utilized is randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, different symbols are used to form the stacks of symbols. For example, in the above-described embodiments, cherry symbols, bell symbols, and lemon symbols were used to form stacks of symbols. However, any suitable symbol can be used to form a stack of symbols. In one embodiment, the reels are configured such that some of the symbols on the reels are designated as stacking symbols, while other symbols are configured as non-stacking symbols. In one such embodiment, the symbols used to form a stack of symbols are derived from a particular theme associated with the gaming device. In another embodiment of a gaming device having virtual reels including more than twenty-two symbols, a stack of symbols is formed from each type of symbol on the virtual reel.

In one embodiment, the game including stacks of symbols is configured as a primary game. For example, a gaming device can be configured to enable a player to immediately begin playing the game including stacks of symbols upon a wager on the game. In one embodiment, the player must make a minimum wager before the gaming device enables the game including stacks of symbols. That is, the reels in the primary game are not configured with stacks of symbols until the player's wager meets a predetermined threshold. In an alternative embodiment, the game including stacks of symbols is configured as a secondary or bonus game. In one such embodiment, if a predetermined triggering event occurs in a primary game, the game device is configured to enable a player to play the game including stacks of symbols. In one embodiment, the triggering event in the primary game may not occur until the player made a minimum wager on the primary game.

In one alternative embodiment, one of the symbols used to form the stack of symbols includes wild symbols. In one such embodiment, if a reel generates a stack of wild symbols positioned adjacent or between two reels that generated identical stacks of symbols, the gaming device treats the wild symbols like the surrounding or adjacent identical stacks of symbols. For example, if a reel generated a stack of wild symbols positioned between two stacks of cherry symbols, the gaming device treats the wild symbols as a stack of cherry symbols when determining the number of winning outcomes. In an alternative embodiment, if one reel generates a stack of wild symbols and the reel is positioned adjacent to or between two reels that did not generate any stacks of symbols, the gaming device converts some of the symbols on the two adjacent or surrounding reels into stacks of wild symbols or stacks of other symbols that can form one or more winning symbol combinations.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming system comprising:
at least one input device;
at least one display device configured to display a game;
at least one processor; and
at least one memory device storing a plurality of instructions which, when executed by the at least one processor, cause the at least one processor to operate with the at least one display device and the at least one input device to:
(a) display the game, the game including a plurality of adjacent reels, a plurality of symbol display positions associated with the reels, and a plurality of different static symbols on each of the reels, one of the symbols being a designated symbol, wherein:
(i) a first one of the reels includes a first plurality of the symbols including a first quantity of the designated symbol, the first quantity being at least two, wherein the designated symbols of the first quantity of the designated symbol are adjacent to each other on the first one of the reels and form a first stack of the designated symbol;
(ii) a second one of the reels includes a second plurality of the symbols including a second quantity of the same designated symbol that is greater than the first quantity of the designated symbol, wherein the designated symbols of the second quantity of the designated symbol are adjacent to each other on the second one of the reels and form a second stack of the designated symbol;
(iii) a third one of the reels includes a third plurality of the symbols including a third quantity of the same designated symbol that is greater than the first and second quantities of the designated symbol, wherein the designated symbols of the third quantity of the designated symbol are adjacent to each other on the third one of the reels and form a third stack of the designated symbol; and
(iv) the first one of the reels, the second one of the reels, and the third one of the reels are arranged such that the designated symbols of the first, second, and third stacks of the designated symbol can be displayed at the symbol display positions to form a plurality of winning combinations of the designated symbol, each said winning combination of the designated symbol being associated with a different set of the symbol display positions; and
(b) for a play of the game:
(i) receive a wager from a player;
(ii) for each of the reels, generate and display a plurality of the symbols at the symbol display positions associated with said reel;
(iii) determine any awards to be provided to the player based on a comparison of:
(A) the symbols displayed at the symbol display positions; and
(B) a plurality of winning combinations of the symbols including the plurality of winning combinations of the designated symbol, wherein if the designated symbols of the first, second, and third stacks of the designated symbol are displayed at the symbol display positions and form the plurality of winning combinations of the designated symbol, the at least one processor determines an award associated with said winning combinations of the designated symbol; and
(iv) display any determined awards.

2. The gaming system of claim 1, wherein the quantities of the designated symbol that form each stack of the designated symbol incrementally increase from the first stack of the designated symbol to the third stack of the designated symbol.

3. The gaming system of claim 1, wherein each reel includes an additional quantity of the symbols to form an additional stack of the designated symbol.

4. The gaming system of claim 1, wherein each reel includes an additional quantity of the symbols to form at least one stack of a second designated symbol.

5. The gaming system of claim 1, wherein each reel includes a plurality of additional quantities of the symbols that form a plurality of additional stacks of symbols from each type of the plurality of symbols on each reel.

6. The gaming system of claim 1, which includes a subsequent reel, wherein said subsequent reel includes a plurality of the symbols including a subsequent quantity of the designated symbol that is greater than or less than each of the previous quantities of the designated symbol, wherein the designated symbols of the subsequent quantity of the designated symbol are adjacent to each other on the subsequent reel and form a subsequent stack of the designated symbol.

7. The gaming system of claim 6, wherein the subsequent quantity of the designated symbol is greater than the previous quantities of the designated symbol.

8. The gaming system of claim 1, wherein the first reel is positioned to the left of the second and third reels, and the second reel is positioned to the left of the third reel.

9. A gaming system comprising:

at least one input device;

at least one display device configured to display a game, the game including a plurality of adjacent reels, a plurality of symbol display positions associated with the reels, and a plurality of different static symbols on each of the reels, one of the symbols being a designated symbol;

at least one processor; and at least one memory device storing a plurality of instructions which, when executed by the at least one processor, cause the at least one processor to operate with the at least one display device and the at least one input device to, for a play of the game:

(a) for each of the reels, generate and display a plurality of the symbols at the symbol display positions associated with said reel, wherein:

(i) a first one of the reels includes a first stack of the designated symbol and a plurality of non-stacked symbols, the first stack of the designated symbol including at least one designated symbol, each of the designated symbols being adjacent to each other on the first one of the reels;

(ii) a second one of the reels includes a second stack of the same designated symbol and at least one non-stacked symbol, the second stack of the designated symbol including more designated symbols than the first stack of the designated symbol, each of the designated symbols being adjacent to each other on the second one of the reels;

(iii) a third one of the reels includes a third stack of the same designated symbol and at least one non-stacked symbol, the third stack of the designated symbol including more designated symbols than the second stack of the designated symbol, each of the designated symbols being adjacent to each other on the third one of the reels; and (iv) the first one of the reels, the second one of the reels, and the third one of the reels are arranged such that the designated symbols of the first, second, and third stacks of the designated symbol can be displayed at the symbol display positions to form a plurality of winning combinations of the designated symbol, each said winning combination of the designated symbol being associated with a different set of the symbol display positions;

(b) determine any awards to be provided to the player based on a comparison of:

(i) the symbols displayed at the symbol display positions; and (ii) a plurality of winning combinations of the symbols including the plurality of winning combinations of the designated symbol, wherein if the designated symbols of the first, second, and third stacks of the designated symbol are displayed at the symbol display positions and form the plurality of winning combinations of the designated symbol, the at least one processor determines an award associated with said winning combinations of the designated symbol; and (c) display any determined awards.

10. The gaming system of claim 9, wherein each stack of the designated symbol includes a plurality of the designated symbol.

11. The gaming system of claim 9, including a subsequent reel, wherein said subsequent reel includes a subsequent stack of the designated symbol and one or more non-stacked symbol, wherein the subsequent stack of the designated symbol is different than the previous stacks of the designated symbol displayed on the previous reels.

12. The gaming system of claim 11, wherein the subsequent stack of the designated symbol includes more designated symbols than the previous stacks of the designated symbol.

13. The gaming system of claim 9, wherein each reel includes an additional quantity of the symbols to form an additional stack of the designated symbol.

14. The gaming system of claim 9, wherein the displayed quantities of the designated symbol that form each stack of the designated symbol incrementally increase from the first stack of the designated symbol to the third stack of the designated symbol.

15. The gaming system of claim 9, wherein each reel includes a plurality of additional quantities of the symbols that form a plurality of additional stacks of symbols from each type of the plurality of symbols on each reel.

16. A gaming system comprising:

at least one input device;

at least one display device configured to display a game;

at least one processor; and at least one memory device storing a plurality of instructions which, when executed by the at least one processor, cause the at least one processor to operate with the at least one display device and the at least one input device to:

(a) display the game, the game including a plurality of adjacent reels, a plurality of symbol display positions associated with the reels, and a plurality of different static symbols on each of the reels, one of the symbols being a designated symbol, another one of the symbols being a second designated symbol, wherein:

(i) a first one of the reels includes a first plurality of the symbols including a first quantity of the designated symbol and a first quantity of the second designated symbol, the first quantity of the designated symbol and the first quantity of the second designated symbol each being at least one, wherein:

(A) if the first quantity of the designated symbol is greater than one, the designated symbols of the first quantity of the designated symbol are adjacent to each other on the first one of the reels and form a first stack of the designated symbol; and (B) if the first quantity of the second designated symbol is greater than one, the designated symbols of the first quantity of the second designated symbol are adjacent to each other on the first one of the reels and form a first stack of the second designated symbol;

(ii) a second one of the reels includes a second plurality of the symbols including a second quantity of the same designated symbol that is different than the first quantity of the designated symbol and a second quantity of the same second designated symbol that is different than the first quantity of the second designated symbol, the second quantity of the designated symbol being at least two, the second quantity of the second designated symbol being at least two, wherein:

(A) the designated symbols of the second quantity of the designated symbol are adjacent to each other on the second one of the reels and form a second stack of the designated symbol; and (B) the designated symbols of the second quantity of the second designated symbol are adjacent to each other on the second one of the reels and form a second stack of the second designated symbol;

(iii) a third one of the reels includes a third plurality of the symbols including a third quantity of the same designated symbol that is greater than the first and second quantities of the designated symbol and a third quantity of the same second designated symbol that is greater than the first and second quantities of the second designated symbol, the second quantity of the designated symbol being at least two, the second quantity of the second designated symbol being at least two, wherein:

(A) the designated symbols of the third quantity of the designated symbol are adjacent to each other on the third one of the reels and form a third stack of the designated symbol; and (B) the designated symbols of the third quantity of the second designated symbol are adjacent to each other on the third one of the reels and form a third stack of the second designated symbol; and (iv) the first one of the reels, the second one of the reels, and the third one of the reels are arranged such that:

(A) the designated symbols of the first, second, and third stacks of the designated symbol can be displayed at the symbol display positions to form a plurality of winning combinations of the designated symbol, each said winning combination of the designated symbol being associated with a different set of the symbol display positions; and (B) the second designated symbols of the first, second, and third stacks of the second designated symbol can be displayed at the symbol display positions to form a plurality of winning combinations of the second designated symbol, each said winning combination of the second designated symbol being associated with a different set of the symbol display positions; and (b) for a play of the game:

(i) receive a wager from a player;

(ii) for each of the reels, generate and display a plurality of the symbols at the symbol display positions associated with said reel;

(iii) determine any awards to be provided to the player based on a comparison of:

(A) the symbols displayed at the symbol display positions; and (B) a plurality of winning combinations of the symbols including the plurality of winning combinations of the designated symbol and the plurality of winning combinations of the second designated symbol, wherein:

(1) if the designated symbols of the first, second, and third stacks of the designated symbol are displayed at the symbol display positions and form the plurality of winning combinations of the designated symbol, the at least one processor determines an award associated with said winning combinations of the designated symbol; and (2) if the second designated symbols of the first, second, and third stacks of the second designated symbol are displayed at the symbol display positions and form the plurality of winning combinations of the second designated symbol, the at least one processor determines an award associated with said winning combinations of the second designated symbol; and (iv) display any determined awards.

17. A gaming system comprising:

at least one input device;

at least one display device configured to display a game;

at least one processor; and at least one memory device storing a plurality of instructions which, when executed by the at least one processor, cause the at least one processor to operate with the at least one display device and the at least one input device to:

(a) display the game, the game including a plurality of adjacent reels, a plurality of symbol display positions associated with the reels, and a plurality of different static symbols on each of the reels, one of the symbols being a designated symbol, wherein:

(i) a first one of the reels includes a first plurality of the symbols including a first quantity of the designated symbol, the first quantity being at least one, wherein, if the first quantity is greater than one, the designated symbols of the first quantity of the designated symbol are adjacent to each other on the first one of the reels and form a first stack of the designated symbol;

(ii) a second one of the reels includes a second plurality of the symbols including a second quantity of the same designated symbol that is greater than the first quantity of the designated symbol, wherein the designated symbols of the second quantity of the designated symbol are adjacent to each other on the second one of the reels and form a second stack of the designated symbol;

(iii) a third one of the reels includes a third plurality of the symbols including a third quantity of the same designated symbol that is greater than the first and second quantities of the designated symbol, wherein the designated symbols of the third quantity of the designated symbol are adjacent to each other on the third one of the reels and form a third stack of the designated symbol; and (iv) the first one of the reels, the second one of the reels, and the third one of the reels are arranged such that the designated symbols of the first, second, and third stacks of the designated symbol can be displayed at the symbol display positions to form a plurality of winning combinations of the designated symbol, each said winning combination of the designated symbol being associated with a different set of the symbol display positions; and (b) for a play of the game:

(i) receive a wager from a player;

(ii) for each of the reels, generate and display a plurality of the symbols at the symbol display positions associated with said reel;

(iii) determine any awards to be provided to the player based on a comparison of:

(A) the symbols displayed at the symbol display positions; and (B) a plurality of winning combinations of the symbols including the plurality of winning combinations of the designated symbol, wherein if the designated symbols of the first, second, and third stacks of the designated symbol are displayed at the symbol display positions and form the plurality of winning combinations of the designated symbol, the at least one processor determines an award associated with said winning combinations of the designated symbol; and (iv) display any determined awards.

* * * * *

UNITED STATES PATENT AND TRADEMARK OFFICE

CERTIFICATE OF CORRECTION

PATENT NO. : 8,096,877 B2
APPLICATION NO. : 11/936364
DATED : January 17, 2012
INVENTOR(S) : Benjamin Hoffman It is certified that error appears in the above-identified patent and that said Letters Patent is hereby corrected as shown below:

IN THE CLAIMS:

In Claim 3, column 26, line 48, replace “symbol” with --designated symbols--.

In Claim 11, column 28, lines 3-4, replace “symbol” with --symbols--.

In Claim 13, column 28, line 12, replace “symbols” with --designated symbols--.

In Claim 16, column 29, line 14, replace the second instance of “second” with --third--.

In Claim 16, column 29, line 16, replace “two” with --three--.

In Claim 16, column 29, line 16, replace the first instance of “second” with --third--.

In Claim 16, column 29, line 17, replace “two” with --three--.

Signed and Sealed this
Twenty-fourth Day of April, 2012

David J. Kappos

David J. Kappos
*Director of the United States Patent and Trademark Office*